US010120760B2

United States Patent
Braun et al.

(10) Patent No.: US 10,120,760 B2
(45) Date of Patent: Nov. 6, 2018

(54) VEHICLE INFOTAINMENT SYSTEM

(71) Applicant: Continental Automotive GmbH, Hannover (DE)

(72) Inventors: Holger Braun, Langgoens (DE); Wolfgang Weber, Wettenberg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/326,385

(22) PCT Filed: Jul. 14, 2015

(86) PCT No.: PCT/EP2015/066048
§ 371 (c)(1),
(2) Date: Jan. 13, 2017

(87) PCT Pub. No.: WO2016/008877
PCT Pub. Date: Jan. 21, 2016

(65) Prior Publication Data
US 2017/0206139 A1     Jul. 20, 2017

(30) Foreign Application Priority Data

Jul. 17, 2014   (DE) ........................ 10 2014 213 922

(51) Int. Cl.
*G06F 11/14*     (2006.01)
*G06F 9/44*      (2018.01)
(Continued)

(52) U.S. Cl.
CPC ............ *G06F 11/1438* (2013.01); *B60L 1/00* (2013.01); *B60R 16/023* (2013.01); *B60R 16/03* (2013.01);
(Continued)

(58) Field of Classification Search
CPC . B60R 16/023; B60R 16/033; G06F 11/1438; G06F 15/7807; G06F 9/4418
(Continued)

(56) References Cited

U.S. PATENT DOCUMENTS

| 4,726,024 A * | 2/1988 | Guziak | G06F 11/0796 |
| | | | 714/24 |
| 4,727,549 A * | 2/1988 | Tulpule | G06F 11/0721 |
| | | | 714/55 |

(Continued)

FOREIGN PATENT DOCUMENTS

WO     2012/097775 A1     7/2012

OTHER PUBLICATIONS

International Search Report and Written Opinion dated Oct. 29, 2015 from corresponding International Patent Application No. PCT/EP2015/066048.
(Continued)

*Primary Examiner* — Tyler J Lee

(57) ABSTRACT

The invention relates to a vehicle infotainment system, comprising a system-on-chip with a restart monitoring device. In this arrangement, the restart monitoring device is designed to determine a number of restarts of the system-on-chip and to deactivate the system-on-chip or to switch it in an idle mode when the number of restarts of the system-on-chip exceeds a predetermined threshold value. In this manner, the restart monitoring device can prevent a discharge of the battery of the vehicle by a faulty loop of restarts.

13 Claims, 2 Drawing Sheets

(51) Int. Cl.
*G06F 15/78* (2006.01)
*B60R 16/033* (2006.01)
*B60R 16/023* (2006.01)
*B60L 1/00* (2006.01)
*B60R 16/03* (2006.01)
*G06F 1/32* (2006.01)
*G06F 9/4401* (2018.01)

(52) U.S. Cl.
CPC .......... *B60R 16/033* (2013.01); *G06F 1/3206* (2013.01); *G06F 9/4418* (2013.01); *G06F 15/7807* (2013.01)

(58) Field of Classification Search
USPC .......................................................... 701/36
See application file for complete search history.

(56) References Cited

U.S. PATENT DOCUMENTS

| | | | | | |
|---|---|---|---|---|---|
| 5,398,332 | A | * | 3/1995 | Komoda | G06F 11/076 714/55 |
| 7,080,281 | B2 | * | 7/2006 | Mueller | G06F 11/0757 714/23 |
| 7,225,369 | B2 | * | 5/2007 | Schumacher | G06F 11/0757 714/55 |
| 8,412,406 | B2 | * | 4/2013 | Johnson | G07C 5/008 701/33.1 |
| 8,943,303 | B2 | * | 1/2015 | Kaltenegger | G06F 11/0757 713/100 |
| 9,751,476 | B2 | * | 9/2017 | Kraft | B60R 16/0231 |
| 2002/0152425 | A1 | * | 10/2002 | Chaiken | G06F 11/0793 714/23 |
| 2003/0079163 | A1 | * | 4/2003 | Hashimoto | G06F 11/0721 714/55 |
| 2003/0149868 | A1 | * | 8/2003 | Mueller | G06F 11/0757 713/1 |
| 2004/0153886 | A1 | * | 8/2004 | Schumacher | G06F 11/0757 714/55 |
| 2007/0276939 | A1 | * | 11/2007 | Funato | G06F 11/0712 709/224 |
| 2010/0312418 | A1 | * | 12/2010 | Kraft | G06F 13/409 701/1 |
| 2012/0041638 | A1 | * | 2/2012 | Johnson | G07C 5/008 701/33.1 |
| 2016/0282927 | A1 | * | 9/2016 | Adams | G06F 1/3287 |
| 2017/0072837 | A1 | * | 3/2017 | Ueno | B60Q 1/1415 |
| 2017/0190261 | A1 | * | 7/2017 | Cheng | B60L 11/1851 |

OTHER PUBLICATIONS

Niall Murphy, "Watchdog Timers", Nov. 1, 2000, http://www.embedded.com/design/debug-and-optimization/4402288/Watchdog-Timers (retrieved Apr. 22, 2015).

Jacob Beningo, "A Review of Watchdog Architectures and their Application to Cubesats" Apr. 28, 2010, http://www.beningo.com/wp-content/uploads/images/Papers/WatchdogArchitectureReview.pdf.

* cited by examiner

VEHICLE INFOTAINMENT SYSTEM

BACKGROUND

The present invention relates to the extension of battery lives for vehicles having a vehicle infotainment system. In particular, the present invention relates to a vehicle infotainment system, a motor vehicle and a method for preventing battery discharge.

Modern motor vehicles often have a plurality of electronic systems, the complexity of which has risen over the course of time. By way of example, many automobiles today are equipped with what are known as infotainment systems that, inter alia, control the multimedia system of the vehicle and often also comprise a navigation system. Further, these infotainment systems can also perform driver assistance functions or be coupled to a driver assistance system.

The infotainment system of a motor vehicle is usually operated by the battery of the motor vehicle, to which other, possibly essential, components of the motor vehicle, such as the starter, for example, are also connected.

BRIEF SUMMARY

It is an object of the invention to increase the availability and reliability of car batteries in motor vehicles.

This object is achieved by the subjects of the main claim and the coordinate claims. Developments and embodiments can be found in the dependent claims, the description below and the figures.

A first aspect of the invention relates to a vehicle infotainment system that comprises a single-chip system having a restart monitoring device. In this case, the restart monitoring device is designed to determine a number of possibly unexpected restarts by the single-chip system.

Further, the restart monitoring device is designed to deactivate the single-chip system or to transfer it to an idle mode when the number of (unexpected) restarts by the single-chip system exceeds a prescribed threshold value.

In other words, a core concept of the invention can be regarded as being that a single-chip system in a vehicle infotainment system has a restart monitoring device integrated into it that checks whether the single-chip system is in a cyclic reset loop. If a cyclic reset loop of this kind for the single-chip system is detected, then the restart monitoring device may be designed to deactivate the single-chip system or to transfer it to an idle mode in order to prevent a single-chip system from constantly consuming current when this reset loop is executed. In this case, the restart monitoring device may be embodied as a reset counter that deactivates the single-chip system or transfers it to the idle mode when the number of reset loops executed exceeds a prescribed threshold value. This makes it possible to ensure that the battery of the motor vehicle is not discharged by an erroneous cycle of restarts by the single-chip system. That is to say that this protects the battery of the motor vehicle against discharge and that the availability and reliability of the battery is therefore also increased.

The invention is based on, inter alia, the insight that single-chip systems in vehicle infotainment systems can have a complex startup process, the reason for which may be, inter alia, the components installed in the vehicle infotainment system. By way of example, vehicle infotainment systems today may be equipped with what are known as NAND memory units, which can possibly require a complex startup process. If, during the startup process, for example, an error that is not correctable in the startup process occurs, then this error can lead to an uncontrolled restart by the single-chip system. By way of example, this error can be brought about by inconsistent, persistent data in a memory of the single-chip system. The subsequent fresh startup by the single-chip system can in this case cause the same error again, as a result of which the system ends in a cyclic loop of restarts that can in turn lead to battery discharge. In order to prevent battery discharge in the event of a cyclic loop of restarts of this kind, the present invention can provide for a restart monitoring device to be integrated in the single-chip system of the vehicle infotainment system.

Within the context of the present invention, a vehicle infotainment system can be understood to mean that said system comprises various functions, such as a car radio or a multimedia system, a navigation system, a hands free device and driver assistance systems, for example. Further, the vehicle infotainment system may also have a user control unit that the vehicle occupants can use to operate and control the system. In this application, a single-chip system can be understood to mean what is known as a system on a chip (SoC). In this case, the single-chip system can denote an integrated circuit on a semiconductor substrate in which all or a large part of the functions of a system, in this case of the vehicle infotainment system, are integrated. This integration is also known to a person skilled in the art by the term monolithic integration. By way of example, the single-chip system can comprise one or more buses, a clock generator, a processor, a memory and also graphics components, audio components and interfaces. Further, the single-chip system may also have a startup memory unit or a boot ROM, which stores program elements responsible for the startup process.

A restart may also be known to a person skilled in the art by the term reset. Further, the restart of the single-chip system may comprise what is known as a boot process of the single-chip system, which denotes booting of the single-chip system and which involves the programs of the single-chip system being started. In other words, the number of restarts can be understood to mean accumulative value that indicates how often the single-chip system has been started or reset. Deactivation of the single-chip system can be understood to mean that the single-chip system is switched off. By way of example, the restart monitoring device may be designed to disconnect the single-chip system from the power supply or battery. Within the context of the invention, the idle mode to which the single-chip system is transferred when the number of restarts exceeds the prescribed threshold value can be understood to mean what is known as a standby mode. Both possibilities, deactivation of the single-chip system and transfer to the idle mode, result in the single-chip system no longer consuming current, and therefore discharge of the battery being prevented. The prescribed threshold value may be stored in a configuration file, for example, that is stored in a memory unit of the single-chip system. Further, the prescribed threshold value may also be configurable by the user. By way of example, the prescribed threshold value can be matched to the effective startup time of the single-chip system by the user.

According to an exemplary embodiment of the invention, the number of restarts is a number of restarts per unit time.

In other words, the restart monitoring device is designed to determine a number of restarts per unit time by the single-chip system and to deactivate the single-chip system, or to transfer it to an idle mode, when the number of restarts per unit time by the single-chip system exceeds a prescribed threshold value. By way of example, the prescribed threshold value may be thirty restarts per minute in this case.

In this way, the restart monitoring device can more reliably determine whether or not the single-chip system is in a cyclic reset loop.

According to a further exemplary embodiment of the invention, the number of restarts is an absolute number. Further, the restart monitoring device is designed to reset the number of restarts when the single-chip system is successfully started up.

In other words the restart monitoring device has an absolute reset counter that is actively reset by the restarting monitoring device after the single-chip system has been successfully loaded and started up. That is to say that the absolute number of restarts can define a number of restarts since a particular time. By way of example, the particular time may be the time of the last successful startup by the single-chip system. In this case, reset of the number of restarts can be understood to mean that the number of restarts is set to the value zero after a successful startup by the single-chip system.

In this way, it is possible to ensure that only erroneous restarts result in the single-chip system being deactivated or transferred to the idle mode.

According to a further exemplary embodiment of the invention, the restart monitoring device is designed to limit a wakeup function of the single-chip system when the number of restarts exceeds the prescribed threshold value. In this case, within the context of the invention, a wakeup function can be understood to mean a wakeup trigger.

In other words, the restart monitoring device may be designed to restrict what is known as the wakeup trigger of the single-chip system or of the vehicle infotainment system or to deactivate all the wakeup triggers. By way of example, the restart monitoring device may be designed to deactivate all wakeup triggers of the vehicle infotainment system apart from manual pushing of the power button when the number of restarts exceeds the prescribed threshold value. This can be understood to mean that wakeup sources that are permanently present are ignored when the number of restarts exceeds the prescribed threshold value. In this way, it is possible to prevent another component of the vehicle from starting up the vehicle infotainment system again, and initiating the erroneous loop of cyclic restarts again, via a wakeup trigger.

According to a further exemplary embodiment of the invention, the single-chip system further has an interface for receiving a wakeup signal. In this case, the restart monitoring device is designed to prevent the single-chip system from waking up when a wakeup signal is received via the interface when the number of restarts exceeds the prescribed threshold value.

In other words, the restart monitoring device may be designed to prevent the wakeup function of wakeup sources that are permanently present. By way of example, the interface may be embodied as a CAN bus. In this case, the restart monitoring device may be designed to prevent what are known as wakeup triggers that are received via the CAN bus.

According to a further exemplary embodiment of the invention, the single-chip system further has a startup memory unit that stores a program code executed for a startup process by the single-chip system. Further, the single-chip system comprises a semipermanent memory unit. The restart monitoring device is further implemented in the startup memory unit. Furthermore, the restart monitoring device is designed to store the determined number of restarts in the semipermanent memory unit.

In other words, the startup memory unit can be understood to mean what is known as a boot ROM of the single-chip system, which is integrated in the single-chip system. Accordingly, the program code that is stored in the startup memory unit can be understood to mean what is known as a bootloader. The bootloader is the implementation of the "complex"—and hence in need of monitoring—potentially error-prone boot process and is not located in the boot ROM. The core task of the boot ROM is to find the bootloader on the possible storage media (e.g. SD card, USB stick internal NAND flash, . . . ), to load it into the RAM, to check authenticity (signature) and to jump to the code. Besides this core task, the boot ROM, as already described, undertakes the task of restart monitoring.

The semipermanent memory unit can denote a memory unit that is integrated in the single-chip system and is writeable and reset safe. That is to say that when the single-chip system restarts, the data of the semipermanent memory unit are not erased. By way of example, the semipermanent memory unit may be an EPROM. The feature that the restart monitoring device is implemented in the startup memory unit can be understood to mean that the restart monitoring device is part of the unalterable boot ROM code.

According to a further exemplary embodiment of the invention, the single-chip system further has a plurality of computer cores that comprises a first portion of the computer cores and a second portion of the computer cores. In this case, the plurality of computer cores are operable by means of a power supply. Further, the second portion of the computer cores is designed to identify a cyclic malfunction in the first portion of the computer cores and, on identification of a cyclic malfunction of this kind in the first portion of the computer cores, to disconnect the power supply for the first portion of the computer cores in order to prevent battery discharge in the motor vehicle.

In this way, the monitoring of the single-chip system can be extended to the prevention of battery discharge in the case of cyclic malfunctions during operation of the single-chip system.

According to a further exemplary embodiment of the invention, the single-chip system further has a memory unit embodied as a NAND memory.

In this way, the vehicle infotainment system can be manufactured more cheaply.

A further aspect of the invention relates to a motor vehicle having a vehicle infotainment system that is described within the context of the present invention.

Within the context of the present invention, a motor vehicle can be understood in this case to mean an automobile or a truck, for example. Advantages and features that relate to the vehicle infotainment system can also characterize the motor vehicle having a vehicle infotainment system in this case.

A further aspect of the invention relates to a method for preventing battery discharge by a vehicle infotainment system having a single-chip system. In this case, the method comprises a step of determination of a number of restarts by the single-chip system by a restart monitoring device of the single-chip system. Further, the method has the step of deactivation, or transfer to an idle mode, of the single-chip system by the restart monitoring device when the determined number of restarts exceeds a prescribed threshold value.

In this case, the method can be performed by a restart monitoring device, described within the context of the invention, of a single-chip system of a vehicle infotainment system. Therefore, features and advantages that relate to the vehicle infotainment system can also characterize the method. Further, the steps of the method can be performed in the indicated order, in another order or in parallel with one another.

Further features, advantages and opportunities for application of the invention will emerge from the description of the exemplary embodiments and figures below. In this case, all the features described and/or graphically represented form the subject matter of the invention independently and in any combination, even regardless of their composition in the individual claims or the back-references thereof.

DETAILED DESCRIPTION

The figures in this case are depicted schematically and in a manner that is not to scale. Where the same reference symbols are indicated in different figures in the description below, these denote elements that correspond to one another. Elements that correspond to one another may also be denoted by different reference symbols, however.

Figure 1:
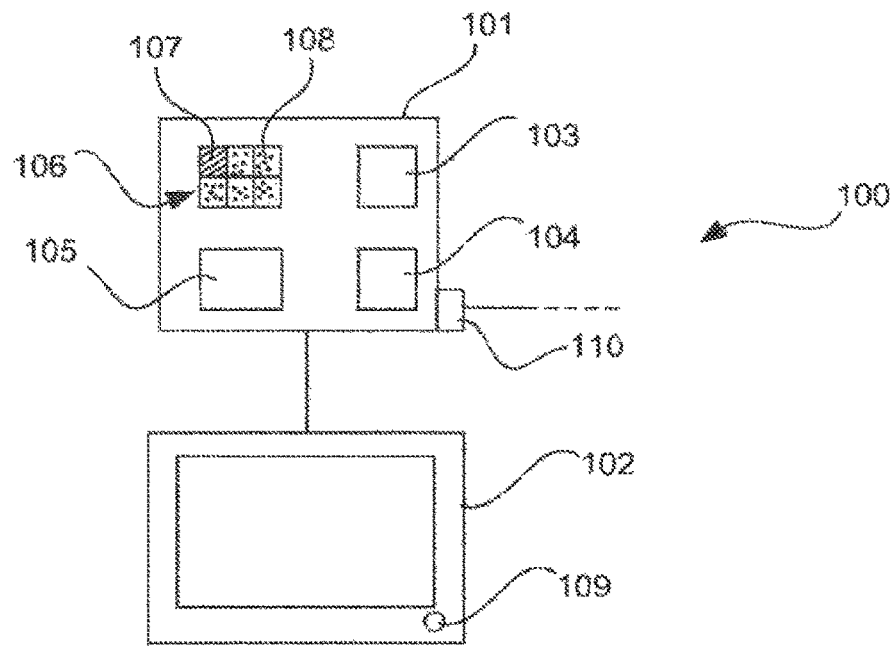
FIG. 1 shows a vehicle infotainment system according to an exemplary embodiment of the invention.

FIG. 1 depicts a vehicle infotainment system 100 according to an exemplary embodiment of the invention. The vehicle infotainment system 100 comprises a single-chip system (SoC) 101 and a user control unit 102 connected thereto. The single-chip system 101 includes a restart monitoring device 103 that is designed to monitor whether the single-chip system is stuck in a cyclic loop of restarts, and in this case deactivates the single-chip system 101 or transfers it to an idle mode. To this end, the restart monitoring device 103 is designed to determine a number of restarts by the single-chip system 101 and to take the determined number of restarts by the single-chip system 101 as a basis for deactivating the single-chip system 101 or transferring it to an idle mode.

Further, the restart monitoring device 103 is designed to limit a wakeup function of the single-chip system 101 when the number of restarts exceeds the prescribed threshold value. By way of example, the restart monitoring device 103 is designed to prevent a wakeup function, initiated via the interface 110 of the single-chip system, when the threshold value is exceeded by the number of restarts. By way of example, the interface 110 is what is known as a CAN bus of the motor vehicle, via which the single-chip system 101 is connected to other components of the motor vehicle and can receive wakeup signals from the other components. Waking-up of the vehicle infotainment system 100 via an on button 109 of the user control unit 102 is additionally activated according to this exemplary embodiment. However, according to other exemplary embodiments of the invention, the restart monitoring device 103 may be designed to deactivate all wakeup functions of the single-chip system 101, including the on button 109.

The single-chip system 101 further also comprises a semipermanent memory unit 104 in which the restart monitoring device 103 stores the determined number of restarts. In this case, the determined number of restarts may be a number of restarts per unit time or an absolute number of restarts by the single-chip system. Further, the single-chip signal 101 comprises a semipermanent memory unit 104, the restart monitoring device 103 being designed to store the determined number of restarts in the semipermanent memory unit 104. If the determined number of restarts by the single-chip system 101 is an absolute number, then the restart monitoring device 103 is further designed to reset, or set to zero, the value stored in the semipermanent memory unit 104, which corresponds to the number of restarts, when the single-chip system is successfully started up.

The single-chip system 101 moreover comprises a plurality of computer cores 106. This plurality of computer cores 106 comprises a first portion of the computer cores 108 and a second portion of the computer cores 107. In this case, the second portion of the computer cores 107 is designed to identify a cyclic malfunction in the first portion of the computer cores 108 and, on identification of a cyclic malfunction in the first portion of the computer cores 108, to disconnect the power supply of the first portion of the computer cores 108 in order to prevent battery discharge in the motor vehicle.

Moreover, the single-chip system 101 comprises a memory unit 105 embodied as a NAND memory. This NAND memory can have the advantage that it is relatively cheap. However, the NAND memory 105 can require a relatively complex startup process, which means that it is particularly advantageous for the startup process of the single-chip system 101 to be checked by the restart monitoring device 103.

Figure 2:
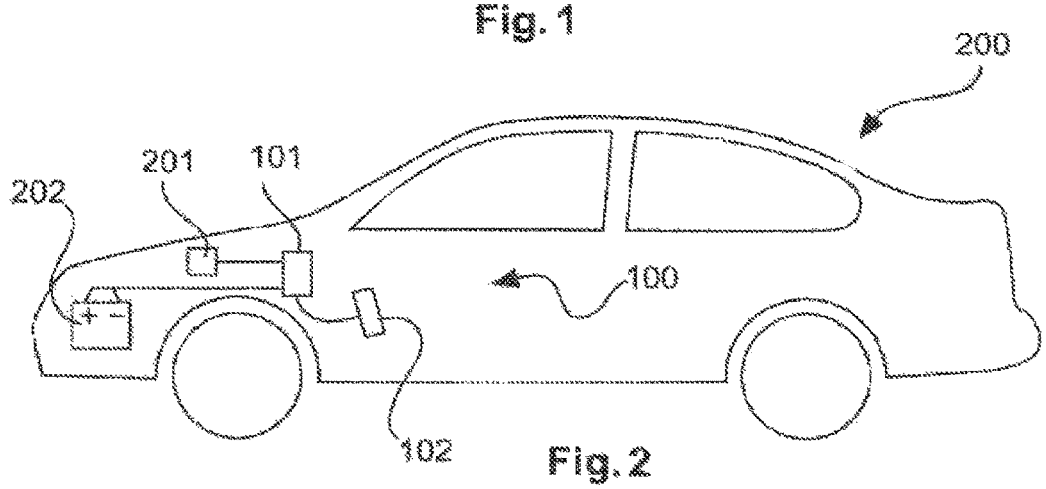
FIG. 2 shows a motor vehicle having a vehicle infotainment system according to an exemplary embodiment of the invention.

FIG. 2 depicts a motor vehicle 200 having a vehicle infotainment system 100 according to an exemplary embodiment of the invention. In this case, the vehicle infotainment system 100 is described in more detail within the context of the exemplary embodiment depicted in FIG. 1. Inter alia, the vehicle infotainment system 100 has a single-chip system 101 and a user control unit 102. For the power supply, the vehicle infotainment system 100 is connected to a battery 202 of the motor vehicle 200. Further, the vehicle infotainment system 100 is connected to other components 201 of the motor vehicle for example via a CAN bus. By way of example, the component 201 may be designed to use the CAN bus to send a wakeup signal to the single-chip system 101.

Figure 3:
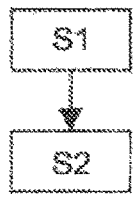
FIG. 3 shows a flowchart for a method according to an exemplary embodiment of the invention.

FIG. 3 depicts a flowchart for a method for preventing battery discharge by a vehicle infotainment system having a single-chip system according to an exemplary embodiment of the invention. In this case, the method comprises step S1 of determination of a number of restarts by the single-chip system by a restart monitoring device of the single-chip system. Further, step S2 of deactivation, or transfer to an idle mode, of the single-chip system by the restart monitoring device is effected when the determined number of restarts exceeds a prescribed threshold value.

Figure 4:
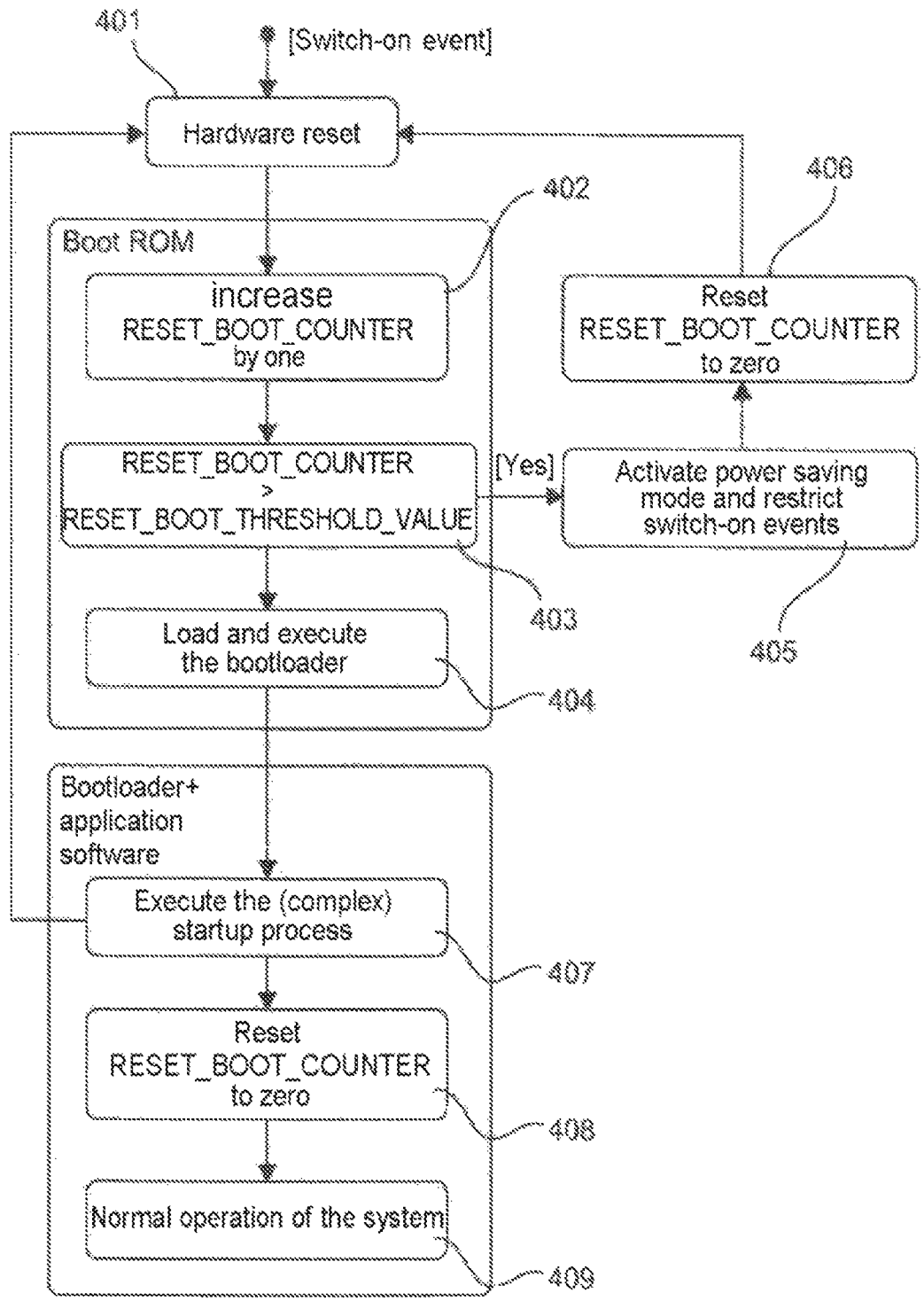
FIG. 4 shows a flowchart of a method performed by boot ROM and bootloader according to an exemplary embodiment of the invention.

FIG. 4 shows a flowchart of a method according to an exemplary embodiment of the invention that is performed by boot ROM and bootloader. After a switch-on event, a hardware reset 401 takes place. The subsequent steps 402 to 404 are performed by the boot ROM.

The RESET_BOOT_COUNTER is a counter in the semipermanent memory of the single-chip system that retains its value even beyond resets.

The RESET_BOOT_COUNTER is incremented by one by the boot ROM in the case of every reset event (see step 402). If it is found in step 403 that the RESET_BOOT_COUNTER is higher than a predetermined threshold value (for example 30), then the power saving mode is activated and switch-on events are restricted in step 405. In step 406, the RESET_BOOT_COUNTER is then reset to zero. Otherwise, the bootloader is loaded and executed in step 404.

The application software (including bootloader) that is started on the single-chip system solution as part of the startup process detects the successful startup (step 407) and can then reset the RESET_BOOT_COUNTER to zero (step 408), whereupon the system operates in normal mode (step 409).

If the startup process is unsuccessful (e.g. on account of an error in the early startup phase), then the program code for identifying a successful startup process is not executed and hence the counter is also not reset. In this case, the hardware reset 401 is performed again.

During the early startup phase, even before any kind of alterable program code is executed, the boot ROM compares the present value of the RESET_BOOT_COUNTER with a permanently set threshold value RESET_BOOT_THRESHOLD_VALUE that is configurable only once (step 403).

In addition, it should be pointed out that "comprising" or "having" does not exclude other elements and "a" or "an" does not exclude a multiplicity. Further, it should be pointed out that features that have been described with reference to one of the embodiments or exemplary embodiments above can also be used in combination with other features of other embodiments or exemplary embodiments described above. Reference symbols in the claims are not intended to be regarded as restrictions.

The invention claimed is:

1. A vehicle infotainment system having:
a single-chip system having a restart monitoring device;
wherein the restart monitoring device is configured to determine a number of restarts by the single-chip system; and
wherein the restart monitoring device is configured to deactivate the single-chip system or to transfer it to an idle mode when the number of restarts by the single-chip system exceeds a prescribed threshold value;
the single-chip system further having:
a plurality of computer cores having a first portion of the computer cores and a second portion of the computer cores;
wherein the plurality of computer cores are operable by means of a power supply;
wherein the second portion of the computer cores is configured to identify a cyclic malfunction in the first portion of the computer cores and, on identification of a cyclic malfunction in the first portion of the computer cores, to disconnect the power supply for the first portion of the computer cores.

2. The vehicle infotainment system as claimed in claim 1, wherein the number of restarts is a number of restarts per unit time.

3. The vehicle infotainment system as claimed in claim 1, wherein the number of restarts is an absolute number; and
wherein the restart monitoring device is configured to reset the number of restarts when the single-chip system is successfully started up.

4. The vehicle infotainment system as claimed in claim 1, wherein the restart monitoring device is configured to limit a wakeup function of the single-chip system when the number of restarts exceeds the prescribed threshold value.

5. The vehicle infotainment system as claimed in claim 4, the single-chip system having:
an interface for receiving a wakeup signal;
wherein the restart monitoring device is configured to prevent the single-chip system from waking up when a wakeup signal is received via the interface when the number of restarts exceeds the prescribed threshold value.

6. The vehicle infotainment system as claimed in claim 5, the single-chip system further having:
a startup memory unit that stores a program code executed for a startup process of the single-chip system;
a semipermanent memory unit;
wherein the restart monitoring device is implemented in the startup memory unit;
wherein the restart monitoring device is configured to store the determined number of restarts in the semipermanent memory unit;
a plurality of computer cores having a first portion of the computer cores and a second portion of the computer cores;
wherein the plurality of computer cores are operable by means of a power supply; and
wherein the second portion of the computer cores is configured to identify a cyclic malfunction in the first portion of the computer cores and, on identification of a cyclic malfunction in the first portion of the computer cores, to disconnect the power supply for the first portion of the computer cores.

7. The vehicle infotainment system as claimed in claim 6, the single-chip system further having: a memory unit embodied as a NAND memory.

8. The vehicle infotainment system as claimed in claim 7, wherein the number of restarts is a number of restarts per unit time.

9. The vehicle infotainment system as claimed in claim 7, wherein the number of restarts is an absolute number; and
wherein the restart monitoring device is configured to reset the number of restarts when the single-chip system is successfully started up.

10. The vehicle infotainment system as claimed in claim 1, the single-chip system further having:
a startup memory unit that stores a program code executed for a startup process of the single-chip system;
a semipermanent memory unit;
wherein the restart monitoring device is implemented in the startup memory unit; and
wherein the restart monitoring device is configured to store the determined number of restarts in the semipermanent memory unit.

11. The vehicle infotainment system as claimed in claim 1, the single-chip system further having: a memory unit embodied as a NAND memory.

12. A motor vehicle having a vehicle infotainment system, the vehicle infotainment system comprising:
a single-chip system having a restart monitoring device;
wherein the restart monitoring device is configured to determine a number of restarts by the single-chip system; and
wherein the restart monitoring device is configured to deactivate the single-chip system or to transfer it to an idle mode when the number of restarts by the single-chip system exceeds a prescribed threshold value; the single-chip system further having: a plurality of computer cores having a first portion of the computer cores and a second portion of the computer cores; wherein the plurality of computer cores are operable by means of a power supply; wherein the second portion of the computer cores is configured to identify a cyclic malfunction in the first portion of the computer cores and, on identification of a cyclic malfunction in the first portion of the computer cores, to disconnect the power supply for the first portion of the computer cores.

13. A method for preventing battery discharge by a vehicle infotainment system having a single-chip system having a plurality of computer cores having a first portion of the computer cores and a second portion of the computer cores, wherein the plurality of computer cores are operable by means of a power supply, the method involving:

determination of a number of restarts by the single-chip system by a restart monitoring device of the single-chip system; and deactivation, or transfer to an idle mode, of the single-chip system by the restart monitoring device when the determined number of restarts exceeds a prescribed threshold value; and identification, by the second portion of the computer cores, of a cyclic malfunction in the first portion of the computer cores and, on identification of the cyclic malfunction in the first portion of the computer cores, disconnection of the power supply for the first portion of the computer cores.

* * * * *